May 1, 1928.  T. MADSEN  1,667,941
PISTON RING
Filed June 11, 1926
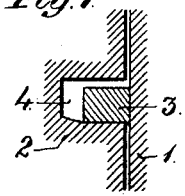
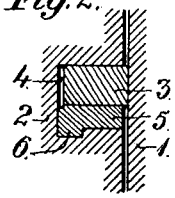
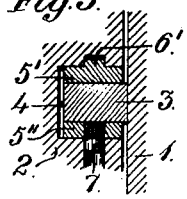
Inventor,
Tage Madsen
By Brown, Boettcher, &Dienner.
Attys.

Patented May 1, 1928.

1,667,941

UNITED STATES PATENT OFFICE.

TAGE MADSEN, OF GOTTENBORG, SWEDEN.

PISTON RING.

Application filed June 11, 1926, Serial No. 115,285, and in Sweden October 7, 1925.

My invention relates to pistons and particularly improved piston ring arrangement and support. It is well known that piston rings and their grooves in the piston are exposed to severe strain and wear, causing in time great variations in their form. Thus both ring and groove will be worn so that their abutting surfaces become more or less conical. When the rings are worn out and must be renewed the conically worn groove must be refinished and this is usually accomplished by a turning process. As the groove also wears in width, the new piston ring must be of corresponding width in order to fit properly. It has been attempted to prolong the life of the piston by making it of a material more resistant to wear, but this increases the expense and does not prevent the eventual wearing out of the piston.

It has been proposed to insert loose rings providing annular grooves for the piston packing rings in order to save the piston from wear. It has also been proposed to provide an aluminum piston with linings or housings for the piston packing rings in order to protect the comparatively soft surface of the aluminum piston groove. Such rings or linings do however not serve their purpose properly unless they are made not only easily renewable when worn out but also easily mountable and so designed that they during use are prevented from moving radially. They have to be fixed in their position in the piston so that the latter is not worn during its use. Preferably the wearing rings should be so designed and mounted that they can not be removed before the packing ring has been removed.

The object of my invention is, therefore, to eliminate the above inconveniences in a simple and effective manner, and I accomplish this by providing a replaceable wearing ring between the piston ring and the side of the groove which is otherwise exposed to wear, said wearing ring being locked in its position so as to prevent any radial movement of the wearing ring during the work.

On the drawing various embodiments of my invention are shown.

Fig. 1 is a sectional view illustrating the well known prior arrangement and the usual wear that results;

Figs. 2 and 3 are cross sectional views showing various adaptations of my invention with single wearing rings.

Fig. 1 illustrates the arrangement generally used heretofore, a piston ring 3 engaging within the groove 4 and its outer edge engaging against the side wall of the cylinder 1. The piston ring plays radially as the piston travels in the cylinder and also wears away at its outer end owing to the friction between said end and the cylinder walls, and consequently the lower inner corner of the groove will receive less wear as the piston ring wears away at its outer side so that the groove will become more or less of oblique cross section. The groove also increases in width, owing to the wear against its side by the piston ring. It is evident that before a new piston ring can be inserted, the groove must be refinished and made true. My invention will eliminate such refinishing work and will permit the use of standard size piston rings.

In single acting engines, in accordance with my invention, two or more rings are fitted to each piston ring groove 4 of the piston 2, one of them being a piston packing ring 3 and having the same function as a common piston packing ring and therefore slides against the cylinder wall 1 during the working, while the other ring which is a wearing ring 5 rests against the side of the groove that otherwise is exposed to wear. The first mentioned ring is thus radially movable as usual during the work of the piston, while the other one has a fixed position in the piston, either by being exposed to centrally directed forces or secured in some other suitable manner.

In the embodiment shown in Fig. 2 the wearing ring 5 rests in a groove 6 turned in the wearing side of the piston groove, whereby the remaining edge of said side prevents the ring 5 from being moved outward by the pressure on its inside caused by the gas pressure within the cylinder. As the ring 5 is thus retained upon its resting surface, such surface can not be worn obliquely. The contacting surfaces between the rings 3 and 5 however will become worn and thus a new ring 5 has to be substituted simultaneously with the exchange of the ring 3. As the size of these rings can be standardized as well as the piston rings now used a substitution of rings will be easily performed without any dressing or adjusting of the piston itself.

In double acting engines the arrangement of the rings will be similar to that described except that the piston ring will be provided with a wearing ring on each side. In Fig. 3 the wearing rings 5 have different shape than that shown in Fig. 2. The wearing ring 5' is provided with a projection or flange 6' engaging in a corresponding groove disposed in the piston. The ring 5" has pins or studs 7 for which there are provided suitable apertures in the piston.

In the arrangements described above, the wearing rings may be in the form of cut open rings which are mounted in the same manner as the piston packing rings by being expanded and slipped over the piston, or they may be made in several parts or segments which are kept in place by the shown and described flanges or studs.

The piston can at every exchange of packing and wearing rings be considered as having been renewed and will therefore last as long as the engine in which it is used because the new wearing rings can always be of the same diameter as that of the worn out wearing rings when they were new, even though the piston should become worn during its sliding against the sides of the cylinder and therefore become smaller in time. Thus a piston which according to hitherto practised rules has become considered worn out and therefore has been scrapped can now be used again if provided with turned grooves for wearing rings according to this invention. In such case the wearing rings serve as guides for the piston packing rings and a very good fit can be obtained with these old pistons provided that the diameter of the wearing rings be made large enough, viz., larger than the worn piston diameter. The same applies also to such cases where the cylinder is worn and has to be rebored. The diameter of the cylinder will be larger in time and this is compensated for by using larger wearing rings. Thus an old cylinder which on account of reboring has become too large to be used according to old practice can now be used again to great advantage if provided with wearing rings in accordance with this invention.

The advantage obtained by my invention is that the sides of the piston grooves are not worn and consequently there will be no need of using any special, expensive material for the piston. Another advantage is that the piston packing rings gain a more even movement during the work of the piston without rocking, thereby saving the cylinder from great wear and producing a better fit against the cylinder wall. When using the old method in adjusting the grooves by hand the grooves oftentimes received different width or its sides became non-parallel thereby causing a rocking movement of the ring and a bad fit, and as a result thereof greater wear.

A further advantage obtained by my invention is that there will be no necessity of keeping a large stock of different piston packing rings because only a small number of different rings will be used when the pistons are provided with wearing rings.

I claim:—

1. In combination, a piston having a groove, a packing ring in said groove, and a replaceable wearing ring between said packing ring and that side of said groove which is otherwise exposed to wear, said side of the groove being provided with recesses within the outer surface of the piston, said wearing ring being split and provided with projections to closely engage said recesses.

2. In combination, a piston having a groove, a packing ring in said groove, and replaceable wearing ring between said packing ring and that side of said groove which is otherwise exposed to wear and abutments on said piston and wearing ring interengaging to lock said wearing ring in said groove against radial displacement.

3. In combination, a piston having a groove, a packing ring in said groove, and a replaceable wearing ring between said packing ring and that side of said groove which is otherwise exposed to wear, said side of the groove being provided with recesses within the outer surface of the piston, said wearing ring being divided in segments and provided with projections to closely engage said recesses.

4. In combination, a piston having a groove, a packing ring in said groove, and a replaceable split wearing ring on each side of said packing ring, said wearing rings being provided with projections, said groove being provided with recesses to receive said projections.

5. In combination, a piston having a groove, a packing ring in said groove, and a replaceable split wearing ring between said packing ring and that side of said groove which is otherwise exposed to wear, said side of the groove being provided with recesses within the outer surface of the piston, said wearing ring being provided with projections to engage said recesses.

In witness whereof, I hereunto subscribe my name this 22nd day of May, 1926.

TAGE MADSEN.